(«12») United States Patent
Nicholls

(10) Patent No.: US 10,770,693 B2
(45) Date of Patent: Sep. 8, 2020

(54) APPARATUS COMPRISING BATTERY CELLS AND A METHOD OF ASSEMBLING

(71) Applicant: Jaguar Land Rover Limited, Whitley, Coventry, Warwickshire (GB)

(72) Inventor: Stephen Nicholls, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 133 days.

(21) Appl. No.: 15/766,300

(22) PCT Filed: Sep. 26, 2016

(86) PCT No.: PCT/EP2016/072850
§ 371 (c)(1),
(2) Date: Apr. 5, 2018

(87) PCT Pub. No.: WO2017/063856
PCT Pub. Date: Apr. 20, 2017

(65) Prior Publication Data
US 2018/0301668 A1 Oct. 18, 2018

(30) Foreign Application Priority Data
Oct. 14, 2015 (GB) .................................. 1518178.7

(51) Int. Cl.
*H01M 10/625* (2014.01)
*H01M 2/02* (2006.01)
(Continued)

(52) U.S. Cl.
CPC ........... *H01M 2/0242* (2013.01); *B60L 50/64* (2019.02); *H01M 2/028* (2013.01);
(Continued)

(58) Field of Classification Search
CPC .......................... H01M 2/0242; H01M 10/625
See application file for complete search history.

(56) References Cited

U.S. PATENT DOCUMENTS

2003/0031921 A1* 2/2003 Nakanishi ............. H01M 2/105
429/99
2005/0037260 A1 2/2005 Shen
(Continued)

FOREIGN PATENT DOCUMENTS

DE 10 2011 082 288 A1 3/2013
JP 10-106521 A 4/1998
(Continued)

OTHER PUBLICATIONS

Patents Act 1977: Combined Search and Examination Report under Sections 17 and 18(3), UKIPO Application No. GB1518178.7, dated Jul. 5, 2016, 6 pp.
Patents Act 1977: Examination Report under Section 18(3), UKIPO Application No. GB1518178.7, dated Mar. 2, 2018, 3 pp.
International Search Report and Written Opinion of the International Searching Authority, International Application No. PCT/EP2016/072850, dated Jan. 23, 2017, 13 pp.

*Primary Examiner* — Olatunji A Godo
(74) *Attorney, Agent, or Firm* — Reising Ethington P.C.

(57) ABSTRACT

An apparatus (101, 101B, 101C, 101D, 101E), an electrical system (706), a vehicle (701) and a method (800) are disclosed. The apparatus (101) comprises a plurality of battery cells (102), each of the battery cells (102) comprising a layer of positive electrode material (103), a layer of electrolyte material (104) and a layer of negative electrode material (105). The apparatus also comprises a container means for containing battery cells (106, 106B, 106D, 6E) formed of an electrically conductive material and having a plurality of cavities (107). Each of the cavities contains at least a respective one of the battery cells (102), and the container means (106, 106B, 106D, 106E) is in direct contact with at least one of the positive electrode material (103) and the electrolyte material (104) of each battery cell (102) or alternatively at least one of the negative electrode material (105) and the electrolyte material (104) of each battery cell (102).

20 Claims, 9 Drawing Sheets

(51) Int. Cl.
*H01M 2/24* (2006.01)
*H01M 10/6557* (2014.01)
*H01M 2/26* (2006.01)
*H01M 10/04* (2006.01)
*H01M 2/10* (2006.01)
*B60L 50/64* (2019.01)
*H01M 10/613* (2014.01)
*H01M 2/04* (2006.01)

(52) U.S. Cl.
CPC ....... *H01M 2/0262* (2013.01); *H01M 2/0285* (2013.01); *H01M 2/043* (2013.01); *H01M 2/1077* (2013.01); *H01M 2/24* (2013.01); *H01M 2/26* (2013.01); *H01M 2/266* (2013.01); *H01M 10/04* (2013.01); *H01M 10/0431* (2013.01); *H01M 10/613* (2015.04); *H01M 10/625* (2015.04); *H01M 10/6557* (2015.04); *H01M 2220/20* (2013.01)

(56) References Cited

U.S. PATENT DOCUMENTS

| | | |
|---|---|---|
| 2010/0304197 A1 | 12/2010 | Bhardwaj et al. |
| 2011/0269002 A1 | 11/2011 | Kanata et al. |
| 2012/0009451 A1* | 1/2012 | Yoo ............ H01M 2/0434 |
| | | 429/94 |
| 2012/0114997 A1 | 5/2012 | Chen et al. |
| 2013/0115493 A1 | 5/2013 | Fuhr et al. |
| 2014/0178755 A1 | 6/2014 | Oda et al. |
| 2015/0221904 A1 | 8/2015 | Frutschy et al. |

FOREIGN PATENT DOCUMENTS

| WO | WO 87/07433 A1 | 12/1987 |
|---|---|---|
| WO | WO 2013/018841 A1 | 2/2013 |

\* cited by examiner

APPARATUS COMPRISING BATTERY CELLS AND A METHOD OF ASSEMBLING

RELATED APPLICATIONS

This application is a 35 U.S.C. § 371 national stage application of PCT Application No. PCT/EP2016/072850, filed on Sep. 26, 2016, which claims priority from Great Britain Patent Application No. 1518178.7, filed on Oct. 14, 2015, the contents of which are incorporated herein by reference in their entireties. The above-referenced PCT International Application was published in the English language as International Publication No. WO 2017/063856 A1 on Apr. 20, 2017.

TECHNICAL FIELD

The present disclosure relates to an apparatus comprising battery cells and a method of assembling. In particular, but not exclusively it relates to an apparatus comprising battery cells and a method of assembling such an apparatus for use in vehicles.

Aspects of the invention relate to an apparatus, a method, an electrical system and a vehicle.

BACKGROUND

It is known to provide a body for receiving a plurality of battery cells that are appropriately connected to provide the required voltage and power for a vehicle, such as an electrically powered vehicle or hybrid vehicle. A continuing problem with such arrangements is that they take up space and add weight to the vehicle. A second problem is that heat is generated within the battery cells which must be extracted efficiently.

It is an aim of the present invention to increase the energy that may be stored in a given volume (or decrease the volume required for a given amount of stored electrical energy.) A second aim is to increase the efficiency of heat extraction from the battery cells.

SUMMARY OF THE INVENTION

Aspects of the embodiments of the invention provide an apparatus, method, electrical system and a vehicle as claimed in the appended claims.

According to an aspect of the invention there is provided an apparatus comprising: a plurality of battery cells, each of the battery cells comprising a layer of positive electrode material, a layer of electrolyte material and a layer of negative electrode material; and a container means for containing battery cells, the container means being formed of an electrically conductive material having a plurality of cavities, each said cavity containing at least a respective one of the battery cells, wherein the container means is in direct contact with at least one of the positive electrode material and the electrolyte material of each battery cell or alternatively the container means is in direct contact with at least one of the negative electrode material and the electrolyte material of each battery cell.

Thus, there is nothing located between at least one of the positive electrode material, the electrolyte material and the negative electrode material of a battery cell and the container means. That is, there is no can, or other container, encapsulating the electrode material. This provides the advantage that the space that would otherwise have been taken up by the can is saved. Alternatively, the space that would otherwise have been taken up by the can may be taken up by additional electrode material to increase the storage capacity of the battery cells. In addition, because the layered structure of the battery cells is in direct contact with the container means, heat may be more efficiently extracted from the battery cells and into the container means.

The container means may be a body formed of an electrically conducting material.

The apparatus may be for providing electrical energy in a vehicle, such as an electrically powered vehicle or hybrid vehicle.

In some embodiments, the container means defines a passageway for enabling the flow of a cooling fluid through the container means. Thus, heat extraction from the battery cells is further improved.

In some embodiments, the cavities are defined by interior wall surfaces of the container means and the interior wall surfaces are cylindrical. Thus, the cavities are configured to receive battery cells comprising a coiled structure, referred to as a "jelly roll" or "Swiss roll" formed using conventional techniques.

In some embodiments, each of the battery cells comprises a coiled structure.

In some embodiments, electrically conductive material comprises a metal or metal alloy. The metal or metal alloy may comprise aluminium or aluminium alloy. Thus, the containing means, or body, may be relatively lightweight and may be formed by extrusion.

In some embodiments, the cavities each have a first end closed by a combination of insulating means and electrical connection means, the insulating means providing electrical insulation between the electrical connection means and the container means. The insulating means may comprise a single insulating element that extends over a plurality of the cavities. By having such a single insulating element the assembly of the apparatus is made relating simple.

The electrical connection means may comprise a connector plate extending over a plurality of the cavities. The connector plate may comprise a plate defining apertures that are aligned with the cavities, and each aperture is closed by a lid. By providing a plate with apertures that are closed by a lid, enables a simple method of construction of the apparatus to be used in which electrodes of the battery cells are connected to the lids before the lids are fitted.

A battery cell may have an electrical conductor connected to the positive electrode of the battery cell and to the lid closing the respective aperture. The positive electrode may have a tab and the electrical conductor is connected to the tab.

In some embodiments, each of the cavities has a second end closed by an electrically conducting end wall that is electrically connected to the container means. The negative electrode of one of the battery cells in a first one of the cavities may have a tab connected to the electrically conducting end wall that closes the first one of the cavities. A single electrically conductive element may provide the electrically conducting end wall of a plurality of the cavities. The single electrically conductive element may be permanently attached to the remainder of the container means. The single electrically conductive element may be permanently attached to the remainder of the container means by brazing.

In some embodiments, the container means has a first face and an adjacent second face extending at an angle to the first face, and the single electrically conductive element has a first portion extending across the first face and a second portion extending past the second face away from the container means. This provides the advantage that the second portion may be used to provide electrical connection with other container means or other electrical components.

The container means may be the first container means of a plurality of container means each defining a plurality of cavities containing battery cells, and the second portion of the single electrically conducting element may provide electrical connection between the battery cells of the first container means and battery cells of a second container means. The second portion of the single electrically conducting element may provide electrical connection between the negative electrodes of the battery cells of the first container means and positive electrodes of the battery cells of a second container means. An insulating means may be located between the first container means and the second container means. The insulating means may be a sheet of insulating material. The sheet of insulating material may be configured to hold the first container means and the second container means together. Thus, the insulating material performs the function of insulating the first container means form the second container means but advantageously also performs the function of holding the two container means together.

The sheet of insulating material may be provided with features configured to mechanically engage with features of the first container means and the second container means.

In some embodiments, the container means may be the first container means of a plurality of container means each defining a plurality of cavities containing battery cells, the negative electrodes of the first container means being electrically connected to the positive electrodes of a second container means, and wherein the plurality of container means are located within an insulating case.

According to another aspect of the invention there is provided an apparatus comprising: a plurality of battery cells, each of the battery cells comprising a layer of positive electrode material, a layer of electrolyte material and a layer of negative electrode material; and a body formed of an electrically conductive material having a plurality of cavities, each said cavity containing at least a respective one of the battery cells, wherein the body is in direct contact with at least one of the positive electrode material and the electrolyte material of each battery cell or alternatively the body is in direct contact with at least one of the negative electrode material and the electrolyte material of each battery cell.

According to another aspect of the invention there is provided an electrical system of a vehicle comprising an apparatus in accordance with the claimed apparatus.

According to a further aspect of the invention there is provided a vehicle comprising an apparatus according with the claimed apparatus.

According to a still further aspect of the invention there is provided an apparatus comprising: a plurality of battery cells, each of the battery cells comprising a layer of positive electrode material, a layer of electrolyte material and a layer of negative electrode material; and a body formed of an electrically conductive material which contains the battery cells, wherein the body is in direct contact with at least one of the positive electrode material and the electrolyte material of each battery cell or alternatively the body is in direct contact with at least one of the negative electrode material and the electrolyte material of each battery cell.

According to a still further aspect of the invention there is provided a method of assembling a plurality of battery cells, the method comprising: positioning each one of the battery cells within a respective one of a plurality of cavities defined in a body formed of an electrically conductive material, wherein positioning one of the battery cells within one of the plurality of cavities comprises placing at least one of positive electrode material and electrolyte material of each battery cell in direct contact with the body or alternatively placing at least one of negative electrode material and electrolyte material of each battery cell in direct contact with the body.

In some embodiments, the body is formed of a metal or metal alloy.

In some embodiments, the method comprises positioning insulation means at a first end of the cavities and positioning electrical connection means over the insulating means to close a first end of the cavities. Positioning the insulation means may comprise positioning a single insulating element over a plurality of the cavities. Positioning the electrical connection means may comprise positioning a plate defining apertures over a plurality of cavities and positioning a lid over each of the apertures.

In some embodiments, the method comprises forming an electrical connection between the positive electrode of a battery cell and the respective lid.

In some embodiments, the method comprises forming an electrical connection between the negative electrode of one of the battery cells in a first one of the cavities and an electrically conductive end wall closing a second end of the first one of the cavities.

In some embodiments, the method comprises positioning a single electrically conductive element over a second end of a plurality of the cavities to close the second ends.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
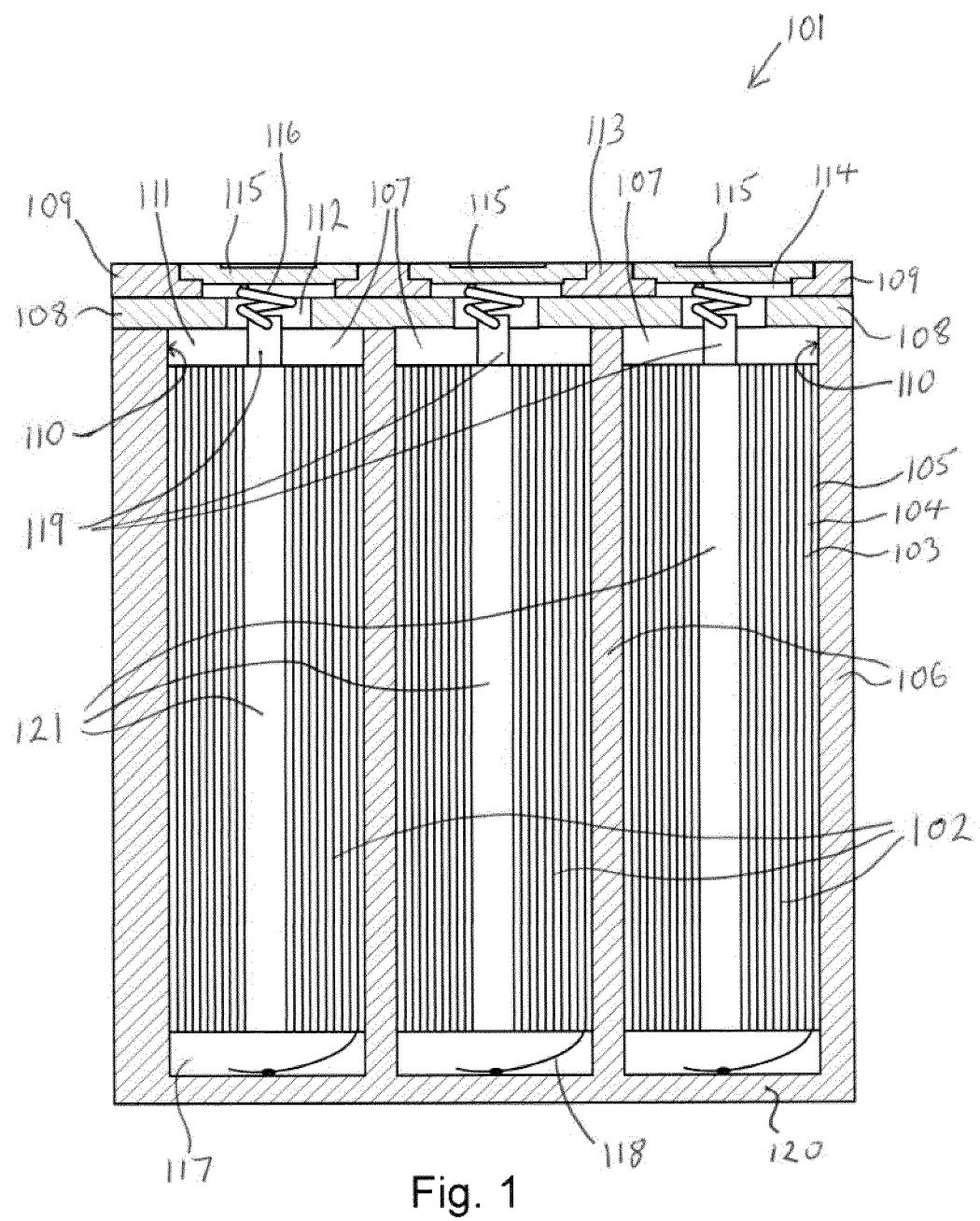
FIG. 1 shows a cross-sectional view of an apparatus 101 according to an embodiment of the present invention.

The Figures illustrate an apparatus 101, 101B, 101C, 101D, 101E comprising: a plurality of battery cells 102, each of the battery cells 102 comprising a layer of positive electrode material 103, a layer of electrolyte material 104 and a layer of negative electrode material 105; and a container means 106, 106B, 106D, 106E for containing battery cells, the container means being formed of an electrically conductive material having a plurality of cavities 107, each said cavity 107 containing at least a respective one of the battery cells 102, wherein the container means 106, 106B, 106D, 106E is in direct contact with at least one of the positive electrode material 103 and the electrolyte material 104 of each battery cell or alternatively the container means 106, 106B, 106D, 106E is in direct contact with at least one of the negative electrode material 105 and the electrolyte material 104 of each battery cell 102.

The container means 106 may comprise a body formed of an electrically conducting material.

Each of the cavities 107 of the apparatus 101 may have a first end 111 closed by a combination of insulating means 108 and electrical connection means 109. The insulating means 108 may be arranged to provide electrical insulation between the electrical connection means 109 and the body 106. The electrical connection means may be configured to allow connection to another electrical component, such as another apparatus 101 or a conductor such as a cable. The insulating means 108 may comprise a single insulating element that extends over a plurality of the cavities, but may alternatively comprise a respective insulating element for each of the cavities.

The electrical connection means 109 may comprises an electrically conductive connector extending over a plurality of the cavities but may alternatively comprise a respective electrically conductive connector for each of the battery cells.

An apparatus 101 according to an embodiment of the present invention is shown in cross-section in FIG. 1. The apparatus 101 comprises a plurality of battery cells 102. Each of the battery cells 102 comprises a layer of positive electrode material 103, a layer of negative electrode material 105 and a layer of electrolyte material 104, which is located between the layers of positive electrode material and negative electrode material. The apparatus 101 also includes a container means 106 for containing a plurality of battery cells 102. In the present embodiment, the container means comprises a body 106 formed of an electrically conductive material having a plurality of cavities 107. Each of the cavities 107 is defined by an inner wall surface 110 of the body 106 and contains at least a respective one of the battery cells 102.

Unlike conventional arrangements, the battery cells 102 are not provided with individual cans, but, instead, the layered structure of positive electrode material, electrolyte material and negative electrode material forming a battery cell is located, without any covering, in one of the cavities 107. Thus, the body 106 is in direct contact with at least one of the positive electrode material 103 and the electrolyte material 104 of each battery cell or alternatively the body 106 is in direct contact with at least one of the negative electrode material 105 and the electrolyte material 104 of each battery cell 102.

In the present example, the outer layer of material forming the layered structure of the battery cells 102 is arranged to be negative electrode material 105, and so negative electrode material is in direct contact with the inner surfaces 110 of the body 106 that define the cavities 107. It is possible that, as well as negative electrode material, some electrolyte material is also in contact with the body. In alternative examples, the outer layer of material forming the layered structure of the battery cells is arranged to be positive electrode material, so that positive electrode material is arranged to be next to the inner surfaces 110 of the body 106 that define the cavities 107. Thus, the body 106 may be at positive electrode potential instead of negative electrode potential.

In neither of these examples is both positive electrode material and negative electrode material placed in contact with the body.

In the present embodiment, the battery cells are formed of layers of negative electrode material, electrolyte material and positive electrode material that is coiled up into a roll. Such an assembly is often referred to as a "jelly roll" or "Swiss roll". In the present embodiment the cavities have a cylindrically shaped inner surface 110 in order to accommodate the coiled structure of the battery cells. However, in an alternative embodiment multiple layers of positive electrode material and negative electrode material may be located in a flat form within cuboid shaped cavities formed in the body.

The battery cells 102 may be rechargeable cells formed of layers of material known for use in battery cells. For example, the battery cells 102 may each be a nickel-cadmium cell, a nickel-metal hydride cell, a type of lithium-ion cell, or other cell chemistry suitable for a vehicle traction battery.

The body 106 may be formed of a metal, such as aluminium, copper, etc. or metal alloy such as aluminium alloy, brass, or other conductive material.

A first end 111 of the cavities 107 may be closed by a combination of the insulating means 108 and the electrical connection means 109. In the present embodiment, the insulating means 108 comprises a single insulating element that extends over a plurality of the cavities 107. In the present example the insulating element 108 is a flat sheet of material that extends across the ends of a plurality of cavities and defines a respective hole 112 for each of the battery cells 102. The insulating element 108 may be formed of a plastics material by moulding or by machining a sheet of material.

The electrical connection means 109 comprises a connector plate 109 which extends over a plurality of the cavities 107. In the present embodiment the connector plate 109 and the insulating element 108 extend over all of the cavities 107 of the body 106.

In the present example, the connector plate 109 comprises a plate 113 defining apertures 114 that are aligned with the cavities 107 and the holes 112 formed in the insulating element 108. Each aperture 114 in the plate 113 is closed by a lid 115. The plate 113 and the lids 115 may be formed of the same metallic material. For example, both the plate 113 and the lids may be formed of aluminium alloy. The lids 115 may be fixed in position on the plate 113 by a weld.

Each of the battery cells 102 may have a similar construction and may be connected to the connector plate 109 in a similar way. In the present example, a battery cell 102 has an electrical conductor 116 connected to the positive electrode 103 of the battery cell and to the lid 115 closing the respective aperture 114. For example the positive electrode 103 may be provided with a tab 119 to which one end of an electrical conductor 116 is attached, for example, by a weld.

The opposite end of the electrical conductor may then be attached to the lid 115, for example by a weld, before the lid is attached to the plate 113.

A second end 117 of the cavities may be closed by an electrically conducting end wall 120 that is electrically connected to the body 106. The electrically conducting end wall 120 may comprise material that is integral with the material of the body 106. For example, the body 106 and the electrically conducting end wall 120 may be formed by machining a single solid block of material or a metal casting. In a further alternative, the body 106 and the electrically conducting end wall 120 may be formed as a single unit from an electrically conductive composite material. In an alternative example, the body 106 may be formed as an extruded aluminium block which defines the cavities 107, and one or more electrically conducting end walls 120 may be fixed to the extrusion. The electrically conducting end wall 120 may comprise a single electrically conducting element 120 that closes the second end of several or all of the cavities 107. For example, the single electrically conducting element 120 may comprise an aluminium plate that is brazed or welded to one end of the extrusion to cover all of the cavities.

In the present embodiment, a tab 118 is provided on the outermost electrode (in the present case the negative electrode) of the battery cell structure. The tab 118 is electrically connected to the body 106 to ensure good electrical contact between the outer electrode and the body. As illustrated in FIG. 1, the tab 118 may be arranged to extend across the end of a hole 121 which extends down the middle of the coiled structure of a battery cell 102. The tab 118 may therefore be attached to the electrically conducting end wall 120 by passing a weld electrode through the hole 121 to weld the tab 118 to the body 106. In an alternative embodiment, the tab 118 may be provided at the first end 111 of the cavity 107 and welded to the inner wall surface 110 of the body 106.

Figure 8:
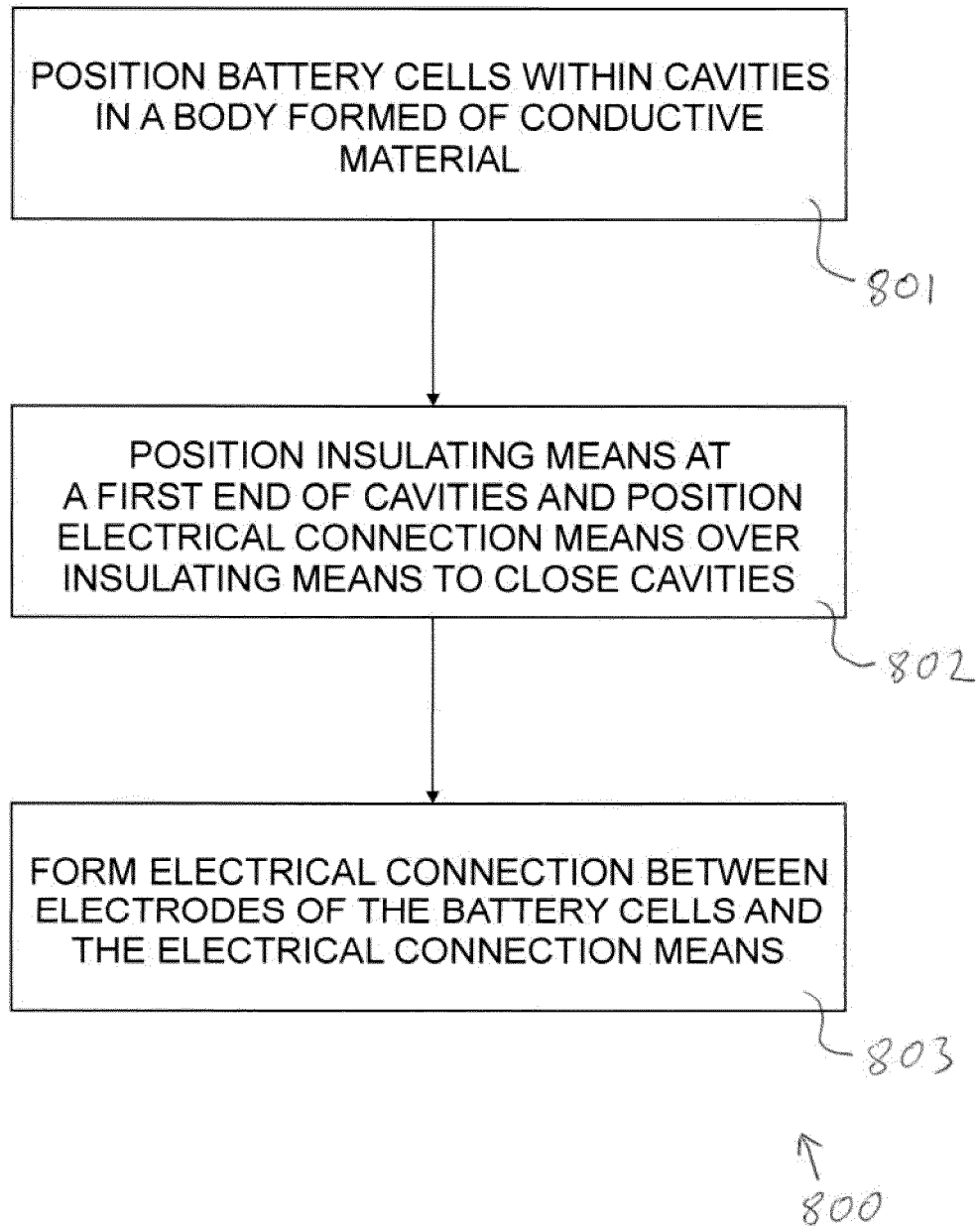
FIG. 8 shows a flow chart outlining a method 800 of assembling a plurality of battery cells, such as battery cells 102.

A flow chart outlining a method 800 of assembling a plurality of battery cells, such as battery cells 102 of FIG. 1, is shown in FIG. 8. At block 801 each one of a plurality of battery cells is positioned within a respective one of a plurality of cavities defined in a body formed of an electrically conductive material. The battery cells may be produced by known methods, but unlike conventional battery cells they are not encapsulated in individual cans. The layered structures comprising positive electrode material (103) and negative electrode material (105) is placed into the cavities so that it is in direct contact with the body. If the positive electrode material is arranged to be outermost in the layered structure then this material, and possibly electrolyte material, will come into contact with the body. Similarly, if the negative electrode material is arranged to be outermost in the layered structure then this material, and possibly electrolyte material, will come into contact with the body.

In an embodiment, the layered structure is a coiled structure that is commonly referred to as a "jelly roll" or "Swiss roll". The layered structure may be formed using conventional methods.

The body itself may have been formed from a metal or metal alloy, such as aluminium alloy, and may have been formed as an extrusion that defines the cavities. In such a case where the body initially has cavities open at both first and second ends, a single electrically conductive element may be positioned over the second ends of the cavities to close them. For example, this may have involved brazing an aluminium plate over the second ends of the cavities. Alternatively, the body may have been formed as a casting or machined from a solid piece of material, in which case the electrically conductive element closing the second ends of the cavities is integrally formed with the remainder of the body.

The method block 801 may also comprise forming an electrical connection between the outermost electrode of the layered structure of the cells and the body. For example, as described above with regard to FIG. 1, a tab 118 provided on the outermost electrode 105 of a layered structure of a battery cell 102 may be welded to the inner wall surface 110 of the body 106 or welded to the electrically conductive element 120 that closes the second end 117 of the cavities. Typically the outermost electrode will be the negative electrode.

At block 802 of the method 800, insulation means is positioned at the first end of the cavities and electrical connection means is positioned over the insulating means to close the first end of the cavities. As is the case with the apparatus 101 of FIG. 1, the insulation means may comprise a single insulating element and positioning the insulation means may comprise positioning the single insulating element across a plurality of the cavities.

Where the insulating means defines holes that have a smaller diameter than the battery cells, as is the case illustrated in FIG. 1, the insulating means is positioned at the first end of the cavities after the battery cells have been positioned at block 801.

The insulating means may be positioned at the first end of the cavities before the electrical connection means is positioned over the insulating means. Alternatively, it is possible that the insulation means and at least a part of the electrical connection means are pre-assembled together before the insulating means is positioned at the first end of the cavities.

As is the case for the apparatus 101 of FIG. 1, the electrical connection means may comprise a plate 113 defining a plurality of apertures 114 and a corresponding plurality of lids 115. In which case, positioning electrical connection means may comprise positioning the plate defining apertures over a plurality of cavities and positioning a lid over each of the apertures.

At block 803, electrical connections are formed between electrodes of the battery cells and the electrical connection means. For the arrangement of FIG. 1, this may comprise forming an electrical connection between the electrodes and a lid 115 that is used to cover the respective aperture 114 in the plate 113. However, it will be understood that alternative methods may be provided for electrically connecting electrodes of each of the battery cells together and to the electrical connection means. For example, the tabs 119 may be connected together by one or more wires that are then connected to the electrical connection means, which may be in the form of a continuous plate.

It will be understood that the electrodes that are connected to the electrical connection means are the electrodes that are not in contact with the body. Typically, the positive electrode will be attached to the electrical connection means, while the body is connected to the negative electrode.

The illustration of a particular order to the blocks in FIG. 8 does not necessarily imply that there is a required or preferred order for the blocks and the order and arrangement of the blocks may be varied. Furthermore, it may be possible for some blocks to be omitted or replaced.

Figure 2:
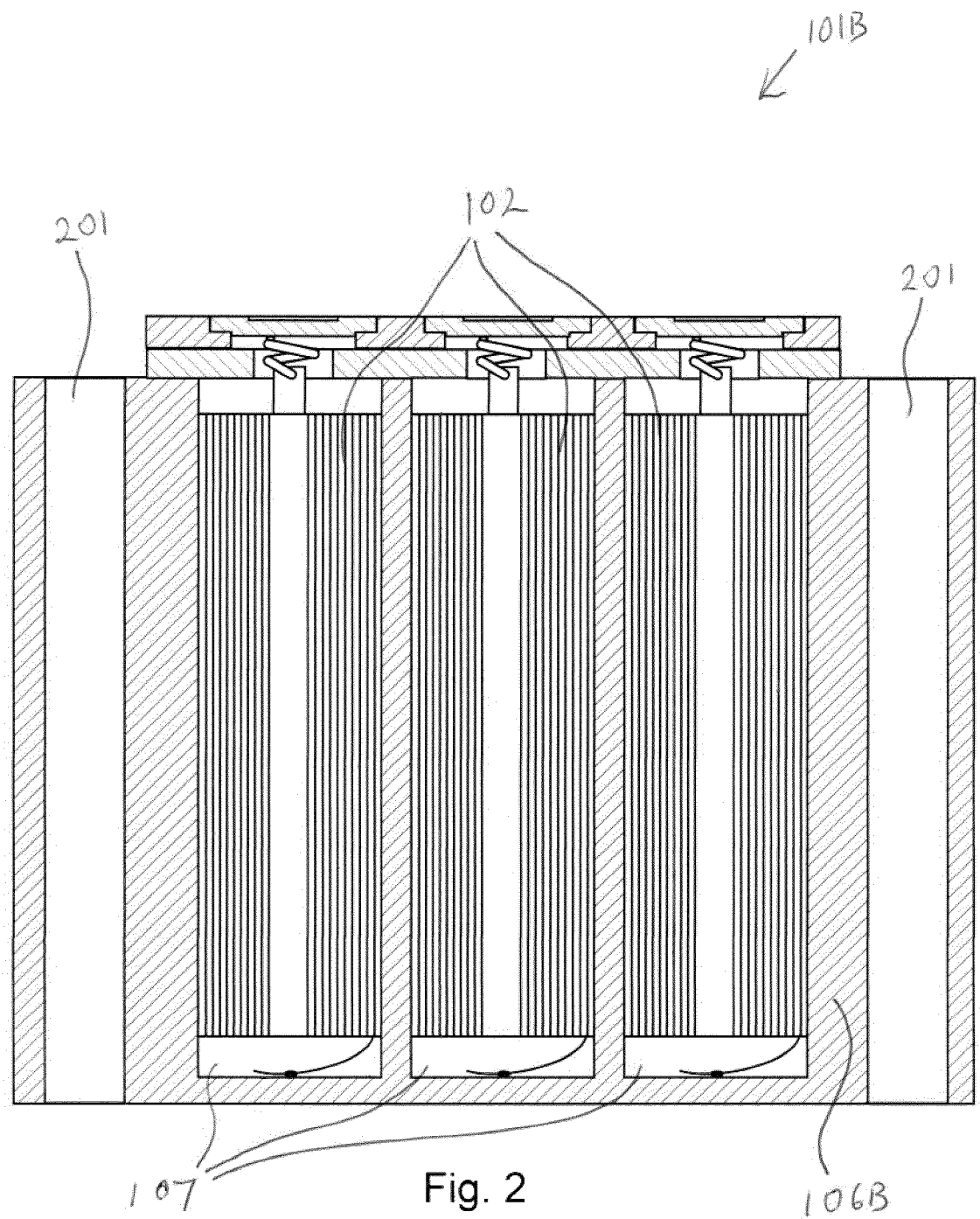
FIG. 2 shows a cross-sectional view of an alternative apparatus 101B according to an embodiment of the present invention.

An alternative apparatus 101B according to an embodiment of the present invention is shown in cross section in FIG. 2. The apparatus 101B is generally identical to the apparatus 101 of FIG. 1 and comprises a plurality of battery cells 102 located in the cavities 107 of a body in the same manner as those of apparatus 101. However, the apparatus of 101B differs from that of apparatus 101 in that the apparatus has a container means in the form of body 106B that is provided with passageways 201 for enabling a flow of a cooling fluid through the body 106B. In use, a fluid may be passed through the passageways to remove heat from the body that is generated by the use of the battery cells. The fluid may be air or may be a liquid, for example a liquid comprising water, that is pumped through the passageways.

Figure 3:
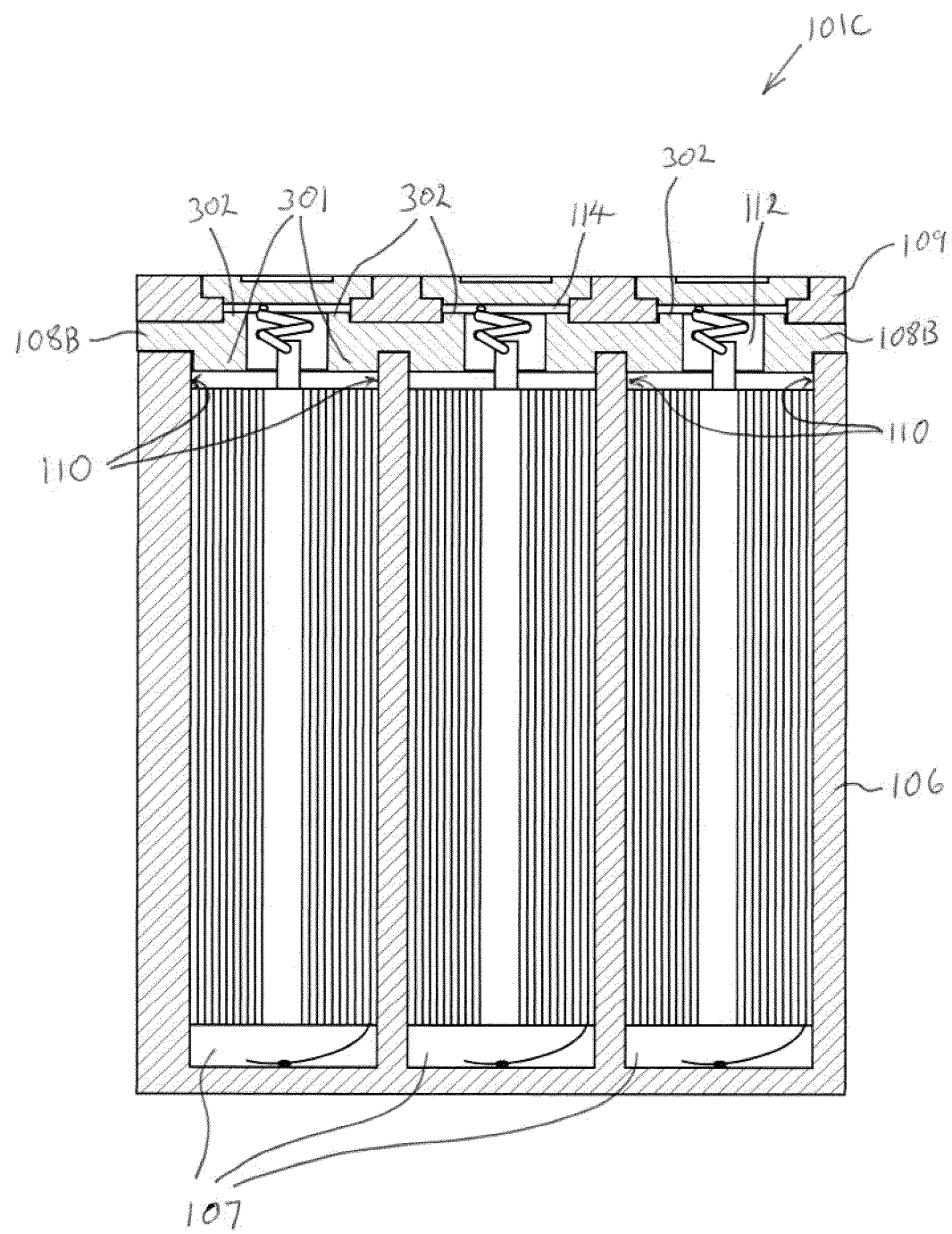
FIG. 3 shows a cross-sectional view of an alternative apparatus 101C according to an embodiment of the present invention.

An alternative apparatus 101C according to an embodiment of the present invention is shown in cross section in FIG. 3. The apparatus 101C is generally identical to the apparatus 101 of FIG. 1 and comprises a plurality of battery cells 102 located in the cavities 107 of a body 106 in the same manner as those of apparatus 101. However, the apparatus of 101C has an insulating element 108B that has features 301 and 302 configured to engage with features provided in the body 106 and in the connector plate 109 respectively. In the present embodiment, the features 301 provided on one side of the insulating element 108B comprise raised rings 301 which surround the holes 112 in the insulating element. The rings 301 are dimensioned to be a good fit within the inner wall surfaces 110 defining the cavities 107. In the present embodiment, the cavities 107 are cylindrical and the rings 301 are circular.

Similarly, in the present embodiment, the features 302 provided on the opposite side of the insulating element 108B comprise raised rings 302 which surround the holes 112 in the insulating element. The rings 302 are dimensioned to be a good fit within the apertures 114 formed in the connector plate 109. In the present embodiment, the apertures 114 are cylindrical and the rings 302 are circular.

Figure 4:
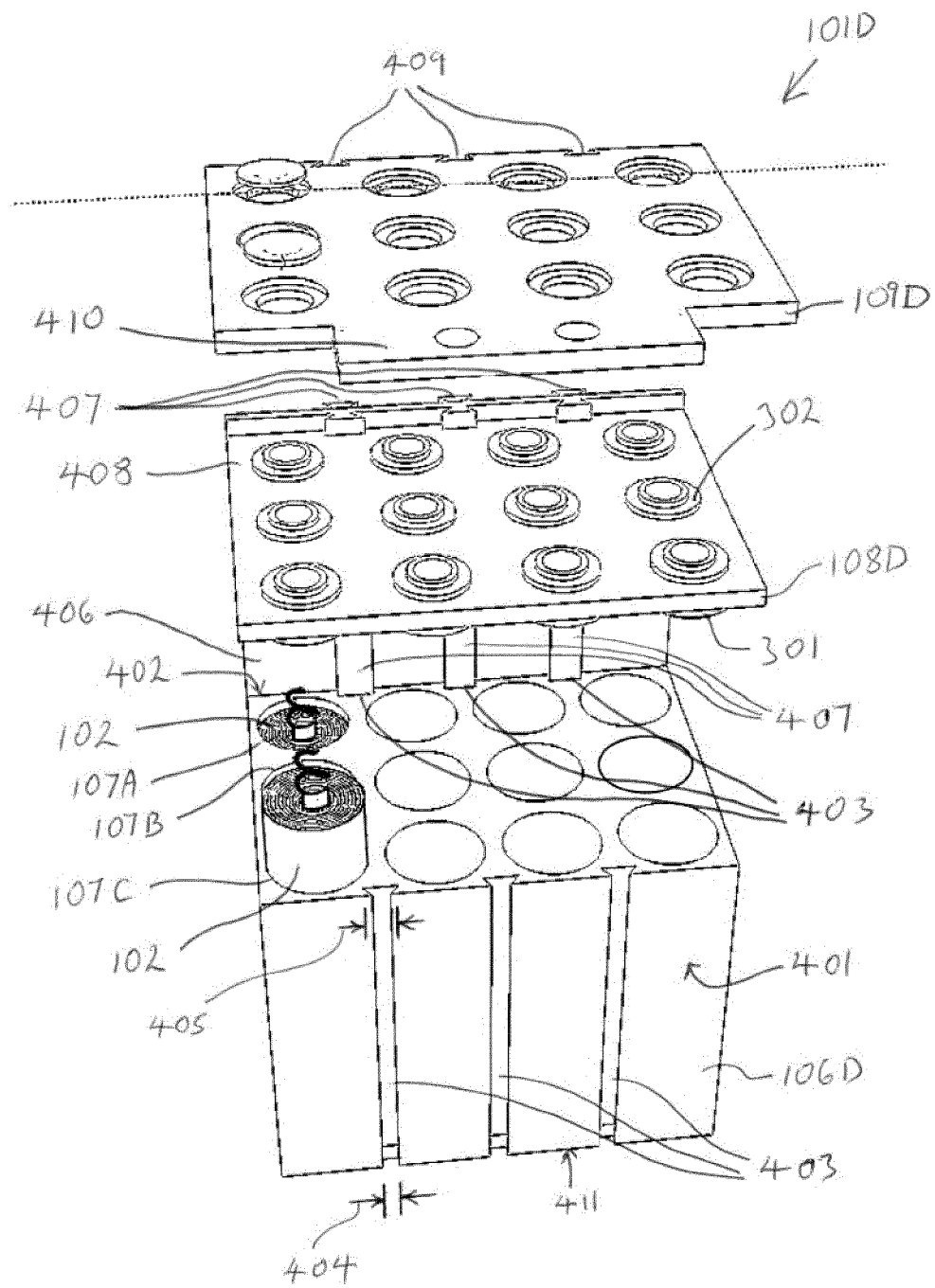
FIG. 4 shows an apparatus 101D according to an embodiment of the present invention in a partially assembled exploded view.

An apparatus 101D according to an embodiment of the present invention is shown in a partially assembled exploded view in FIG. 4. The apparatus 101D, when assembled, is substantially the same as apparatus 101C of FIG. 3 but differs in its insulator means 108D, its connector plate 109D and outer surfaces of its container means 106D.

The container means 106D may be a body of similar construction to the body 106 of apparatus 101 or 101C, and it has twelve cavities 107 formed in a rectangular array. In the present example the array is a 4 by 3 array. That is, the array is 4 cavities long by 3 cavities wide, but other sizes of arrays are envisaged. In the illustrated apparatus 101D, two cavities 107A and 107B contain respective battery cells 102, while a third battery cell 102 is partly inserted into cavity 107C. However, it will be understood that in the complete apparatus 101D, each of the twelve cavities 107 contains a battery cell 102.

The body 106D has two opposing side faces 401 and 402 that extend substantially perpendicularly from an end face 411. The side faces 401 and 402 are provided with a series of parallel slots 403 which extend across the side faces. The slots 403 are provided with a relatively narrow opening 404 when compared to the width of the bottom of the slot, as indicated by arrow 405. In the present example the slots 403 have a dovetail-shaped profile but alternative profiles, such as T-shaped profiles or L-shaped profiles may be used.

The apparatus 101D comprises an insulating connector 406 in the form of a sheet of material that is provided with ridges 407 on both of its opposing faces. The ridges 407 have a similar profile to the slots 403 of the body 106D and are configured to be a sliding fit in the slots 403. Consequently, the insulating connector 406 may be connected to the body 106D by sliding the ridges 407 into the slots 403 on one face (in the present example face 402) of the body 106D. Because the opposite face of the insulating connector 406 also has similar ridges 407, the insulating connector 406 may be also connected to a body 106D of a similar apparatus 101D. In this way the two bodies 106D of the two apparatuses 101 may be connected together using the insulating connector 406.

In the present embodiment, the insulating connector 406 and the insulating element 108D are formed as a single insulating member 408.

The connector plate 109D is also provided with slots 409 on one edge that have a similar profile to the slots 403 of the body 106D, so that the connector plate 109D is also configured to engage with the insulating connector 406.

The opposite edge of the connector plate 109D is provided with a terminal 410 for providing connections to other components.

Figure 5:
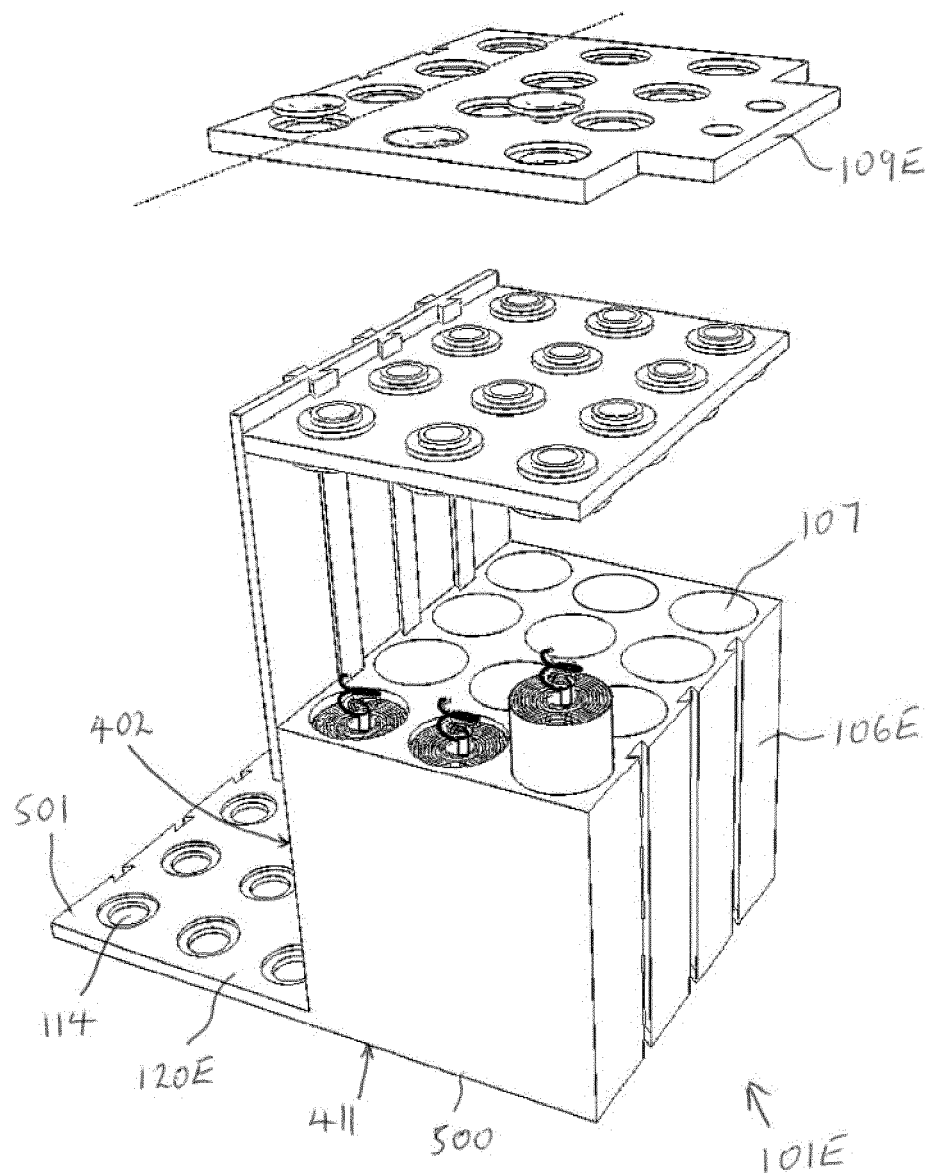
FIG. 5 shows a further alternative apparatus 101E according to an embodiment of the present invention in a partially assembled exploded view.

A further alternative apparatus 101E according to an embodiment of the present invention is illustrated in the partially assembled exploded view of FIG. 5. The apparatus 101E may be substantially the same as apparatus 101D except that it has an elongated electrically conductive element 120E. Like the electrically conductive element 120, the electrically conductive element 120E has a first portion 500 that extends across the end face 411 of the body 106E to close off ends of the cavities 107. However, the electrically conductive element 120E also has a second portion 501 which extends past the side face 402 away from the body 106E.

The second portion 501 may have a similar configuration to the connector plate 109E, in that it has a similar shape, size and apertures 114. The connector plate 109E may therefore be used as the connector plate 109 for a second set of battery cells that are located in a second body.

Figure 6A:
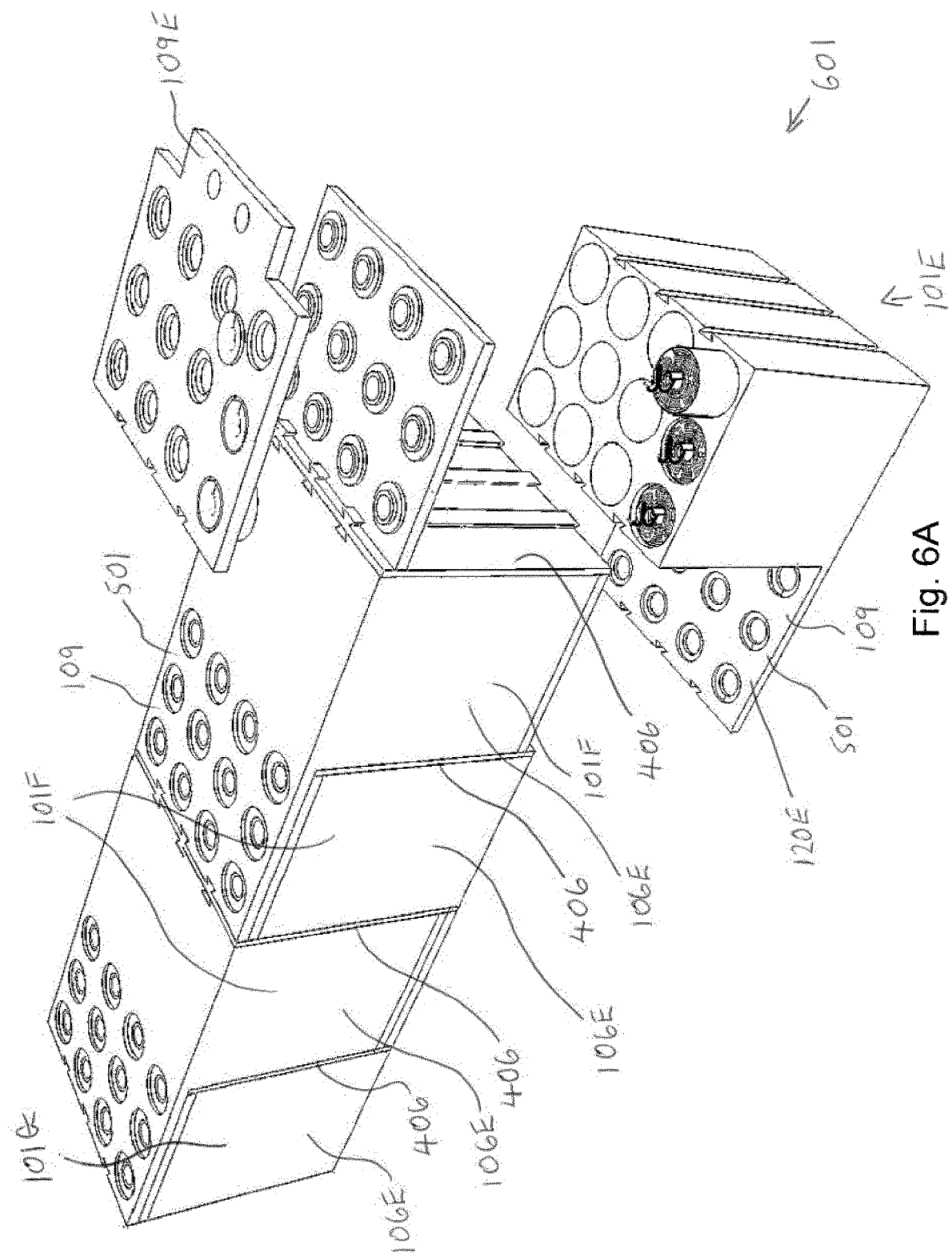
FIGS. 6A and 6B show two alternative perspective views of apparatus 101E being connected to an assembly comprising several similar apparatuses 101F to form a column 601.
Figure 6B:
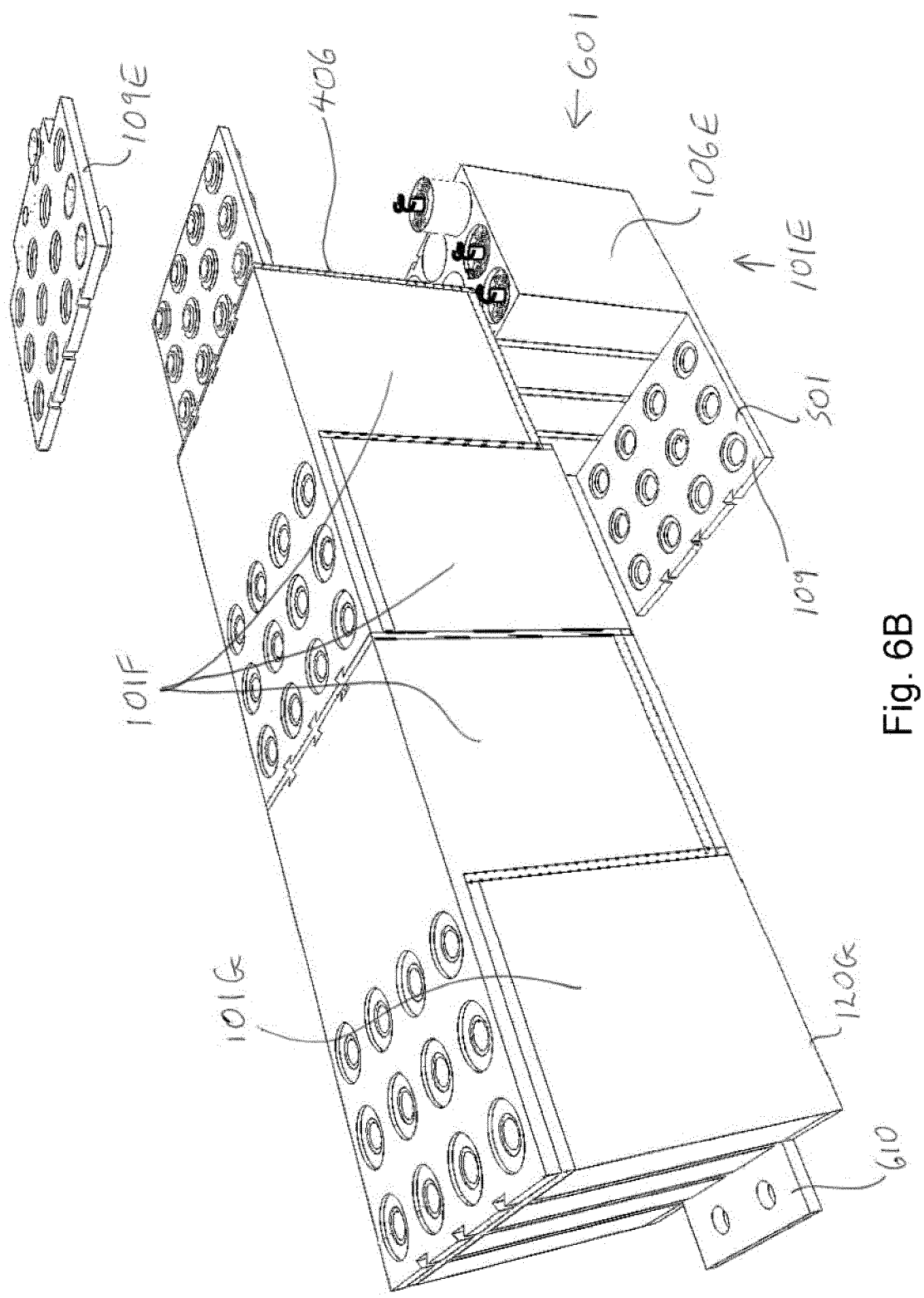

This arrangement of connecting together bodies 106E that each contain a set of battery cells 102 is shown in the two alternative perspective views of FIGS. 6A and 6B. The apparatus 101E is the first of several similar apparatuses 101F, 101G that are arranged to form a continuous column 601. The other apparatuses 101F and 101G have a similar construction to apparatus 101E after they are assembled together as shown. Thus, each of the apparatuses 101F and 101G comprises a body 106E which defines an array of cavities 107 and each cavity contains a battery cell.

An insulating connector 406 is shown already attached to an end face of an end one of the apparatuses 101 forming the column 601. The apparatus 101E may be attached to the insulating connector 406 as described above to attach the apparatus 101E to the apparatus 101F, which forms part of the column 601. In doing this, the second portion 501 of the electrically conductive element 120E becomes the connector plate 109 of the neighbouring apparatus 101F. The positive electrodes of the battery cells in the neighbouring apparatus 101F may be connected to the connector plate 109 (or 501) as described above with respect to FIG. 1.

Thus the second portion 501 of the electrically conducting element 120E provides electrical connection between the negative electrodes of the battery cells 102 of the body 106E of apparatus 101E and positive electrodes of the battery cells of the body 106E of the neighbouring apparatus 101F. In this way, the set of battery cells 102 in the neighbouring apparatus 101F are connected in series with the set of battery cells 102 in the apparatus 101E.

In a similar manner, the second portion 501 of the electrically conductive element 120E of the apparatus 101F that neighbours the apparatus 101E provides the connector plate 109 of the third body 106E in the column, and so on for the next apparatuses 101F. In this way the sets of cells in each of the apparatuses 101E, 101F and 101G are connected in series with one another.

On review of FIG. 6A and FIG. 6B it will be apparent that each of the apparatuses 101E, 101F and 101G are similarly configured. However, apparatus 101E differs from apparatuses 101F in that apparatuses 101F each have a connector plate 109 that forms a part of the electrically conductive element 120E of a body of a neighbouring apparatus, whereas apparatus 101E does not. Also, the apparatus 101G, which is located at the opposite end of the column 601 to apparatus 101E, has an electrically conductive element 120G that is provided with a terminal 610 for providing connections to other components, rather than a second portion 501 for attachment to a neighbouring apparatus.

In the example illustrated in FIGS. 6A and 6B, the column 601 comprises 5 bodies 106E each containing a respective set of battery cells 102. However, it will be understood that the column may comprise more bodies 106E to increase the length of the column when higher voltages are required. Alternatively, or in addition, more than one such column may be connected in series to provide a required voltage.

FIGS. 6A and 6B also illustrate how each of the bodies 106E in the column 601 may be physically attached to one or two neighbouring bodies by an insulating connector 406 to hold the column of bodies 106E together.

Figure 7:
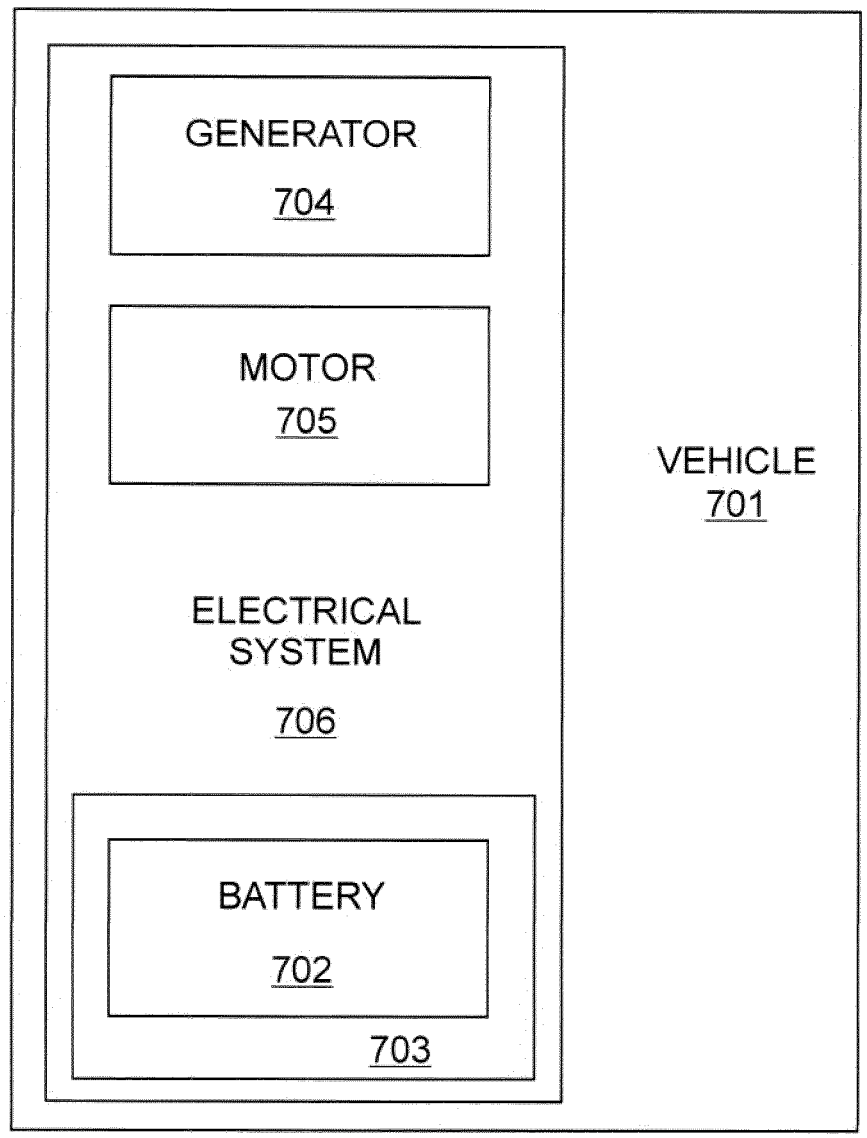
FIG. 7 shows schematically a vehicle 701 comprising a battery 702 formed of a plurality of apparatuses 101.

A vehicle 701 comprising a battery 702 formed of a plurality of apparatuses 101 is shown schematically in FIG. 7. The apparatuses 101 may be configured and assembled together in a column like the apparatuses 101F of FIGS. 6A and 6B. The battery 702 may be located within an insulating case 703 to electrically insulate the apparatuses 101 from other parts of the vehicle.

The battery 702 forms a part of an electrical system 706 of the vehicle 701. The electrical system 706 may also comprise an electrical generator 704 and/or an electric motor 705. Alternatively, the vehicle 701 may be a hybrid vehicle 701 and the electrical generator 704 may be a starter generator.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
    a plurality of battery cells, each of the battery cells comprising a layer of positive electrode material, a layer of electrolyte material and a layer of negative electrode material; and
    a container for the battery cells, the container formed of an electrically conductive material and having a plurality of cavities, each cavity containing at least one of the battery cells,
    wherein the container is in direct contact with at least one of the layer of positive electrode material and the layer of electrolyte material of each battery cell, or alternatively the container is in direct contact with at least one of the layer of negative electrode material and the layer of electrolyte material of each battery cell,
    wherein each cavity has a first end closed by a combination of an insulating element and an electrical connector, the insulating element providing electrical insulation between the electrical connector and the container, and
    wherein the insulating element comprises a single insulating element that extends over one or more of the cavities.

2. The apparatus according to claim 1, wherein the container defines a passageway for enabling a flow of a cooling fluid through the container.

3. The apparatus according to claim 1, wherein the cavities are defined by interior wall surfaces of the container, optionally wherein the interior wall surfaces are cylindrical.

4. The apparatus according to claim 1, wherein each of the battery cells comprises a coiled structure.

5. The apparatus according to claim 1, wherein the electrically conductive material comprises a metal or metal alloy.

6. The apparatus according to claim 5, wherein the metal or metal alloy comprises aluminium or aluminium alloy.

7. The apparatus according to claim 1, wherein the electrical connector comprises a connector plate extending over one or more of the plurality of the cavities.

8. The apparatus according to claim 7, wherein the connector plate comprises a plate defining apertures that are aligned with the cavities, and each aperture is closed by a lid.

9. The apparatus according to claim 8, wherein each battery cell has an electrical conductor connected to the layer of positive electrode material of the battery cell and to the lid closing the respective aperture.

10. The apparatus according to claim 9, wherein the layer of positive electrode material has a tab and the electrical conductor is connected to the tab.

11. The apparatus according to claim 1, wherein each of the cavities has a second end closed by an electrically conducting end wall that is electrically connected to the container.

12. The apparatus according to claim 11, wherein the layer of negative electrode material of one of the battery cells in a first one of the cavities has a tab connected to the electrically conducting end wall that closes the first one of the cavities.

13. The apparatus according to claim 11, wherein a single electrically conductive element provides the electrically conducting end wall of the plurality of the cavities.

14. The apparatus according to claim 13, wherein the container comprises a body having a first face and an adjacent second face extending at an angle to the first face, and the single electrically conductive element has a first portion extending across the first face and a second portion extending past the second face away from the container.

15. The apparatus according to claim 14, wherein the container is a first container of a plurality of containers, each of the plurality of containers defining a plurality of cavities containing battery cells, and the second portion of the single electrically conducting element provides electrical connection between the battery cells of the first container and battery cells of a second container.

16. The apparatus according to claim 15, wherein the second portion of the single electrically conducting element provides electrical connection between the layers of negative electrode material of the battery cells of the first container and the layers of positive electrode material of the battery cells of a second container.

17. The apparatus according to claim 1, wherein the container is a first container of a plurality of containers, each of the plurality of containers defining a plurality of cavities containing battery cells, the layers of negative electrode material of the first container being electrically connected to the layers of positive electrode material of a second container, and wherein the plurality of containers are located within an insulating case.

18. A vehicle or an electrical system of a vehicle comprising the apparatus of claim 1.

19. A method of assembling a plurality of battery cells, the method comprising:

positioning each one of the battery cells within a respective one of a plurality of cavities defined in a body formed of an electrically conductive material, wherein positioning each one of the battery cells within a respective one of the plurality of cavities comprises placing at least one of positive electrode material and electrolyte material of each battery cell in direct contact with the body or alternatively placing at least one of negative electrode material and electrolyte material of each battery cell in direct contact with the body;

positioning an insulating element at a first end of the cavities; and positioning an electrical connector over the insulating element to close a first end of the cavities, wherein said positioning the insulating element comprises positioning a single insulating element over a plurality of the cavities.

20. The method according to claim 19, wherein the method comprises forming an electrical connection between the positive electrode material of a battery cell and a respective lid, or forming an electrical connection between the negative electrode material of one of the battery cells in a first one of the cavities and an electrically conductive end wall closing a second end of the first one of the cavities.

* * * * *